June 26, 1928.

R. L. SCHMITT

ARTIFICIAL TOOTH MOUNTING

Filed Dec. 10, 1926

1,674,922

Inventor
R. L. Schmitt

By Jack A. Schley

Attorney

Patented June 26, 1928.

1,674,922

UNITED STATES PATENT OFFICE.

RUDOLPH L. SCHMITT, OF DALLAS, TEXAS.

ARTIFICIAL-TOOTH MOUNTING.

REISSUED

Application filed December 10, 1926. Serial No. 153,763.

This invention relates to new and useful improvements in artificial tooth mountings for use in dental bridge work.

The object of the invention is to provide a mounting in the form of a yoke adapted to engage in the rear side of the tooth in such a manner as to effectively hold the tooth against displacement and to provide a metal support, which may be readily soldered or brazed to the bridge or other connection.

A particular object of the invention is to provide lugs on the mounting for engaging in notches in the tooth, whereby the tooth will become more securely fastened in the mounting when subjected to downward pressure.

Another object of the invention is to simplify the mounting as well as the tooth received therein.

A construction designed to carry out the invention will be hereinafter described, together with other features of the invention.

Figure 1:
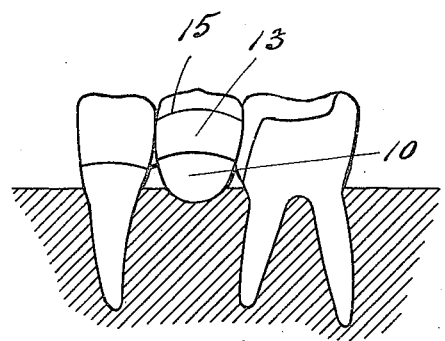
Figure 2:
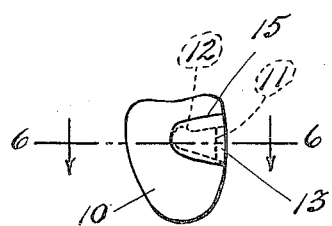
Figure 3:
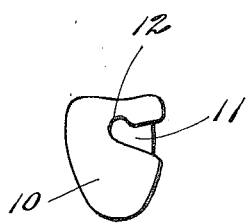
Figure 4:
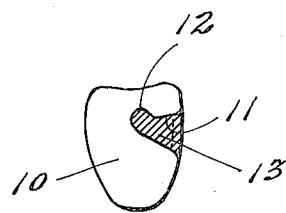
Figure 5:
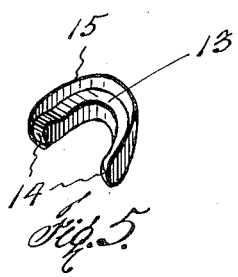
Figure 6:
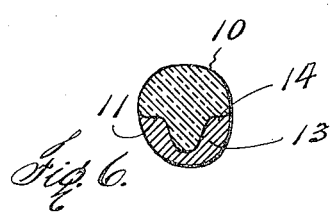

The invention will be more readily understood from a reading of the following specification and by reference to the accompanying drawings, in which an example of the invention is shown and wherein:

Fig. 1 is a back view of a bridge tooth, mounted in accordance with my invention, Fig. 2 is a side elevation of a tooth and its mounting, Fig. 3 is a side elevation of a tooth with the mounting removed, Fig. 4 is a similar view, the mounting being in section, Fig. 5 is a perspective view of the mounting, and Fig. 6 is a horizontal cross-sectional view on the line 6—6 of Fig. 2.

In the drawings the numeral 10 designates an artificial tooth which is suitably formed. On its posterior approximal portion the tooth is formed with a recess, or groove, 11 extending around its rear side and forwardly a short distance on each side to the central portion. The recess is directed inwardly toward the center of the tooth and terminates at each end in a directed notch, or socket, 12, directed toward the occlusal portion of the tooth as is best shown in Fig. 3. The recess is preferably flared toward the rear of the tooth, as is shown.

The mounting consists of a metal yoke 13 shaped to fit in the recess 11 and having angularly projecting rounded lugs 14 at each end, adapted to engage in the sockets 12. The yoke may be formed to fit in the recess flush with the surface of the tooth, or it may have an upwardly extending flange 15 extending over the surface of the tooth.

It will be seen that the yoke forms a clamp and when made to snugly engage in the recess 11, will hold the tooth against displacement. This is particularly due to the lugs 14 and the sockets 12, whereby occlusal pressure on the tooth will merely force it into tighter engagement with the yoke and offset displacement. A much more effective fastening will be had by use of the lugs and sockets.

The mounting, when secured in the recess of the tooth, may be brazed or soldered to the bridge work, as is shown in Fig. 1, or secured in any other manner practiced by dentists. The mounting provides sufficient metal on each side of the tooth and in the rear, if necessary, to substantially connect it with the desired support; however, the mounting is concealed and the artificial tooth presents a natural appearance in front elevation.

Various changes in the size and shape of the different parts, as well as modifications and alterations, may be made within the scope of the appended claim.

What I claim, is:

An artificial tooth mounting including an artificial tooth having a circumferential recess in its posterior approximal portion extending to each side of the tooth and terminating in sockets disposed toward the occlusal portion of the tooth and having reduced entrance portions, and a mounting yoke band fitting said recess and having lugs formed with a reduced neck and interlocked in said sockets to prevent direct withdrawal therefrom.

In testimony whereof I affix my signature.

RUDOLPH L. SCHMITT.